Patented Aug. 1, 1944

2,354,798

UNITED STATES PATENT OFFICE 2,354,798

STABILIZATION OF MOTOR FUELS

Elmer W. Cook, New York, N. Y., and William D. Thomas, Jr., Stamford, Conn., assignors to American Cyanamid Company, New York, N. Y., a corporation of Maine No Drawing. Application November 21, 1941, Serial No. 419,988

2 Claims. (Cl. 44—74)

This invention relates to improvements in motor fuels, particularly those such as gasoline containing gum-forming constituents. More specifically, the invention is concerned with the prevention of gum formation in motor fuels by the addition thereto of a new class of gum inhibitors.

It is a well-known fact that motor fuels produced by cracking processes tend to deteriorate upon storage with the formation of undesirable gums. In general, the higher the cracking temperature employed in processing the gasoline the greater the tendency of it to form gums. Gasoline produced by the polymerization of olefins from cracking still gases and coal-tar benzols, frequently employed in motor fuels, produced by processes employing high temperatures also show gum-forming tendencies. The deterioration of the motor fuel is believed to be due to unsaturated bodies in the fuel which polymerize with the formation of dark colored resinous gums thus lowering the color of the motor fuel and causing the formation of hard resinous deposits on the intake manifold and valves of the engine. It is also thought that gum formation lowers the octane rating of the fuel by removing some of the anti-knock constituents from the fuel.

The prevention of gum formation and deterioration of gasoline has been accomplished in the past by the addition of certain gum formation inhibitors such as phenols, aminophenols and various aryl and alkyl N,N'-substituted p-phenylenediamines and mixtures thereof.

We have now discovered that compounds of the group consisting of p-nitroso-diphenylamine and 4-nitroso-4'-alkoxy-diphenylamines may be added to motor fuels, particularly cracked gasoline, and thereby effectively stabilize the fuel against deterioration and gum formation.

We prefer to prepare the p-nitroso-diphenylamine and 4-nitroso-4'-alkoxy-diphenylamines of the present invention by the method to be presently described although it will be obvious to those skilled in the art that modifications therein may be made in certain details of the process. p-Nitroso-diphenylamine was, for example, prepared as follows:

196 parts by weight of diphenylamine was dissolved in glacial acetic acid and quickly cooled to 6-10° C. A concentrated aqueous solution containing 78 parts of NaNO₂ in 100 parts of water was added gradually with stirring, the temperature of the reaction mixture being maintained at 5-10° C. The mixture was then diluted with approximately an equal quantity of cold water to precipitate most of the N-nitroso diphenylamine formed in the above reaction.

The N-nitroso-diphenylamine was filtered and recrystallized from ethyl alcohol. The purified N-nitroso-diphenylamine was then dissolved in methanol saturated with HCl. A molecular rearrangement of the N-nitroso-diphenylamine occurred during this treatment with alcoholic HCl and upon allowing the mixture to stand the hydrochloride salt of p-nitroso-diphenylamine separated as a reddish-brown crystalline material. The p-nitroso-diphenylamine hydrochloride was separated by filtration and p-nitroso-diphenylamine recovered therefrom by stirring the salt in a dilute aqueous ammonia solution. The compound was then purified by recrystallization from a hot xylene solution and was obtained in the form of shining irridescent dark green crystals having a melting point of 148–150° C.

The 4-nitroso-4'-alkoxy-diphenylamines may be prepared in the same manner as described above from the appropriate monoalkoxy diphenylamine. The 4-nitroso-4'-alkoxy diphenylamines have the following general formula:

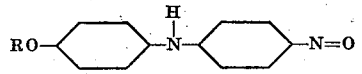

in which R is an alkyl radical of 1–5 carbon atoms. These nitroso alkoxy diphenylamines are even more effective than the p-nitroso-diphenylamine as gum inhibitors and in addition have a better gasoline solubility.

Since the p-nitroso diphenylamine and 4-nitroso-4'-alkoxy diphenylamines are very efficient gum inhibitors they may be employed in amounts ranging from as little as 5 parts of the inhibitor to a million parts of gasoline to amounts exceeding 200 parts per million with increasingly effective results.

Our nitroso-diphenylamines and nitrosoalkoxy diphenylamines are effective in inhibiting gum formation in cracked gasolines, gasoline produced by polymerization of olefins, in blended gasolines containing unsaturated bodies tending to form gums, and in gasolines blended with benzols, alcohols and other combustible materials. They may also be used with conventional anti-knock compositions such as tetraethyl lead and with dyestuffs and other inhibitors of various kinds.

The gum inhibiting ability of p-nitroso-diphenylamine is shown in the following table in which the gum-forming tendencies of gasoline containing our new gum inhibitors was compared with the gum-forming tendencies of the same gasoline containing N-monobutyl-p-aminophenol, a well-known and effective gasoline antioxidant. The results shown in the table were obtained by following the procedure prescribed for the A. S. T. M. oxygen bomb test B525-39T which is recognized in the industry as a standard method of measuring the gum-forming tendencies of gasoline. The results are as follows:

TABLE

A. S. T. M. Oxygen Bomb Test B525-39T

*Cracked type, doctor sweetened gasoline*

| Inhibitor | Concentration | Induction period |
|---|---|---|
| | P. p. m. | Minutes |
| None | | 36 |
| N-monobutyl-p-aminophenol | 50 | 121 |
| p-Nitroso-diphenylamine | 50 | 145 |

What we claim is:

1. A motor fuel comprising gasoline containing gum-forming constituents and 5 to 200 parts per million by weight based on the total weight of the fuel of 4-nitroso-4'-alkoxy diphenylamine as a gum formation inhibitor.

2. A method of stabilizing gasoline which normally tends to deteriorate and develop gum on storage which comprises adding thereto 5 to 200 parts per million by weight of 4-nitroso-4'-alkoxy-diphenylamines.

ELMER W. COOK.
WILLIAM D. THOMAS, Jr.